US010871680B2

(12) United States Patent
Yokoyama et al.

(10) Patent No.: US 10,871,680 B2
(45) Date of Patent: Dec. 22, 2020

(54) TRANSPARENT LIQUID CRYSTAL DEVICE

(71) Applicant: Kent State University, Kent, OH (US)

(72) Inventors: Hiroshi Yokoyama, Hudson, OH (US); Nikolaus Glazar, Kent, OH (US)

(73) Assignee: Hiroshi Yokoyama, Hudson, OH (US)

( * ) Notice: Subject to any disclaimer, the term of this patent is extended or adjusted under 35 U.S.C. 154(b) by 56 days.

(21) Appl. No.: 15/764,526

(22) PCT Filed: Sep. 29, 2016

(86) PCT No.: PCT/US2016/054297
§ 371 (c)(1),
(2) Date: Mar. 29, 2018

(87) PCT Pub. No.: WO2017/058985
PCT Pub. Date: Apr. 6, 2017

(65) Prior Publication Data
US 2018/0284502 A1 Oct. 4, 2018

Related U.S. Application Data

(60) Provisional application No. 62/234,734, filed on Sep. 30, 2015.

(51) Int. Cl.
G02F 1/1337 (2006.01)
G02F 1/19 (2019.01)
G02F 1/1343 (2006.01)

(52) U.S. Cl.
CPC ........ *G02F 1/1337* (2013.01); *G02F 1/13439* (2013.01); *G02F 1/19* (2013.01); *G02F 1/133788* (2013.01); *G02F 2001/133769* (2013.01)

(58) Field of Classification Search
CPC ....... G02F 2001/133769; G02F 1/1337; G02F 1/19; G02F 1/13439; G02F 1/133788
See application file for complete search history.

(56) References Cited

U.S. PATENT DOCUMENTS

| 6,867,836 B2 | 3/2005 | Stalder et al. | |
| 2005/0140862 A1* | 6/2005 | Jang | G02F 1/133711 349/113 |
| 2005/0146670 A1* | 7/2005 | Helgee | C09K 19/02 349/172 |
| 2005/0248705 A1* | 11/2005 | Smith | G02B 5/3016 349/124 |
| 2006/0046163 A1 | 3/2006 | Broer et al. | |

(Continued)

*Primary Examiner* — Jessica M Merlin
(74) *Attorney, Agent, or Firm* — Fay Sharpe LLP

(57) ABSTRACT

A liquid crystal device includes a light source, a first transparent substrate, a first transparent electrode, a switchable or tunable micropatterned alignment layer arranged in an array of pixels, a liquid crystal layer, a fixed alignment layer, a second transparent electrode, and a second transparent substrate. The switchable micropatterned alignment layer is disposed between the liquid crystal layer and one of the first transparent substrate and the second transparent substrate. The fixed alignment layer is disposed between the liquid crystal layer and one of the first transparent substrate and the second transparent substrate. Light from the light source is not visible outside the liquid crystal device when the switchable or tunable micropatterned alignment layer is in an off-state.

18 Claims, 13 Drawing Sheets

(56) References Cited

U.S. PATENT DOCUMENTS

| | | | |
|---|---|---|---|
| 2006/0118763 A1* | 6/2006 | Yun | C09K 19/0403 252/299.63 |
| 2009/0027603 A1 | 1/2009 | Samulski et al. | |
| 2009/0322971 A1 | 12/2009 | Dorjgotov et al. | |
| 2010/0091229 A1* | 4/2010 | Liu | C09K 19/56 349/123 |
| 2011/0292325 A1* | 12/2011 | Minoura | G02F 1/1323 349/112 |
| 2015/0002798 A1* | 1/2015 | Miyakawa | G02F 1/133707 349/123 |
| 2015/0077663 A1 | 3/2015 | Pugh et al. | |

\* cited by examiner

| 210 |
|---|
| 220 |
| 230 |
| 235 |
| 240 |
| 225 |
| 215 |

400

| 410 |
| 430 |
| 420 |
| 440 |
| 425 |
| 435 |
| 415 |

TRANSPARENT LIQUID CRYSTAL DEVICE

This application is a National Stage Entry of International Application No. PCT/US2016/054297, filed Sep. 29, 2016 and titled "TRANSPARENT LIQUID CRYSTAL DEVICE"; and also claims the benefit of U.S. Provisional Application No. 62/234,734 filed Sep. 30, 2015 and titled "TRANSPARENT LIQUID CRYSTAL DEVICE". Both of these applications are incorporated by reference herein in their entireties.

BACKGROUND

The present disclosure relates to liquid crystal devices. In particular, the devices may be polarizer-free, full-color transparent liquid crystal displays. The display devices include a switchable or tunable optical diffraction element embedded in a transparent optical wave guide (e.g., a plane glass plate).

The term "liquid crystal" refers to matter that has properties between those of liquids and solids. An important property of liquid crystals is that they respond to electric current in such a way as to control the passage of light. Liquid crystals are among the first choice of materials for designing devices in the information display technology sector due to their long-range orientational order, fluidity, and optical birefringence. The effective birefringence of an LC, which is an optical property defined by a refractive index that depends on the polarization and propagation of light, may be manipulated by applying an electric field between opposite electrodes which surround LC material. The applied electric field may be dynamically switched to align LC materials along the direction of the applied field.

This dynamic switching of the applied electric field enables the production of low cost, controllable, electro-optical devices such as Liquid Crystal Displays (LCDs). LCD devices are based on the reorientation of liquid crystal molecules such as liquid crystal (LC) molecules by the application of an electric field. Tremendous efforts have been made to improve the performance of LCDs.

It would be desirable to provide a polarizer-free, fast-response speed, flexible LCD.

BRIEF DESCRIPTION

The present disclosure relates to liquid crystal devices such as full-color, transparent liquid crystal displays. The devices include a switchable or tunable micropatterned alignment layer arranged in an array of pixels.

Disclosed in various embodiments are liquid crystal devices including a light source; a first transparent substrate; a first transparent electrode; a switchable or tunable micropatterned alignment layer arranged in an array of pixels; a liquid crystal layer; a fixed alignment layer; a second transparent electrode; and a second transparent substrate. The switchable or tunable micropatterned alignment layer is disposed between the liquid crystal layer and one of the first transparent substrate and the second transparent substrate. The fixed alignment layer is disposed between the liquid crystal layer and one of the first transparent substrate and the second transparent substrate. Light from the light source is not visible outside the liquid crystal device when the switchable or tunable micropatterned alignment layer is in an off-state.

Disclosed in other embodiments are liquid crystal devices including a light source; a first transparent substrate; a first transparent electrode; a switchable or tunable micropatterned alignment layer arranged in an array of pixels; a liquid crystal layer; a fixed alignment layer; a second transparent electrode; and a second transparent substrate. The switchable or tunable micropatterned alignment layer is disposed between the liquid crystal layer and the first transparent substrate. The fixed alignment layer is disposed between the liquid crystal layer and the second transparent substrate. Light from the light source is not visible outside the liquid crystal device when the switchable or tunable micropatterned alignment layer is in an off-state.

Disclosed in further embodiments are liquid crystal devices comprising a light source and further comprising in sequence: a first transparent substrate; a first transparent electrode; a switchable or tunable micropatterned alignment layer arranged in an array of pixels; a liquid crystal layer; a fixed alignment layer; and a second transparent electrode; and a second transparent substrate. Light from the light source is not visible outside the liquid crystal device when the switchable or tunable micropatterned alignment layer is in an off-state.

The switchable or tunable micropatterned alignment layer may be deposited on or embedded in one of the substrates or electrodes.

In some embodiments, the first transparent electrode and the second transparent electrode comprise indium-tin oxide.

The device may be free of polarizers and/or reflective layers.

In some embodiments, switching or tuning of the switchable or tunable micropatterned alignment layer is driven by an in-plane electric field.

The liquid crystal layer may contain nematic liquid crystals.

In some embodiments, the switchable or tunable micropatterned alignment layer is aligned via photoalignment, atomic force microscope nanorubbing, nanoimprinting, or photolithography.

The first micropatterned alignment layer and the second micropatterned alignment layer may contain an azobenzene-based compound that undergoes photo-induced reorientation under the illuminzation of polarized light.

In some embodiments, the liquid crystal layer contains liquid crystals having a birefringence of at least 0.1, at least 0.2, or at least 0.3.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
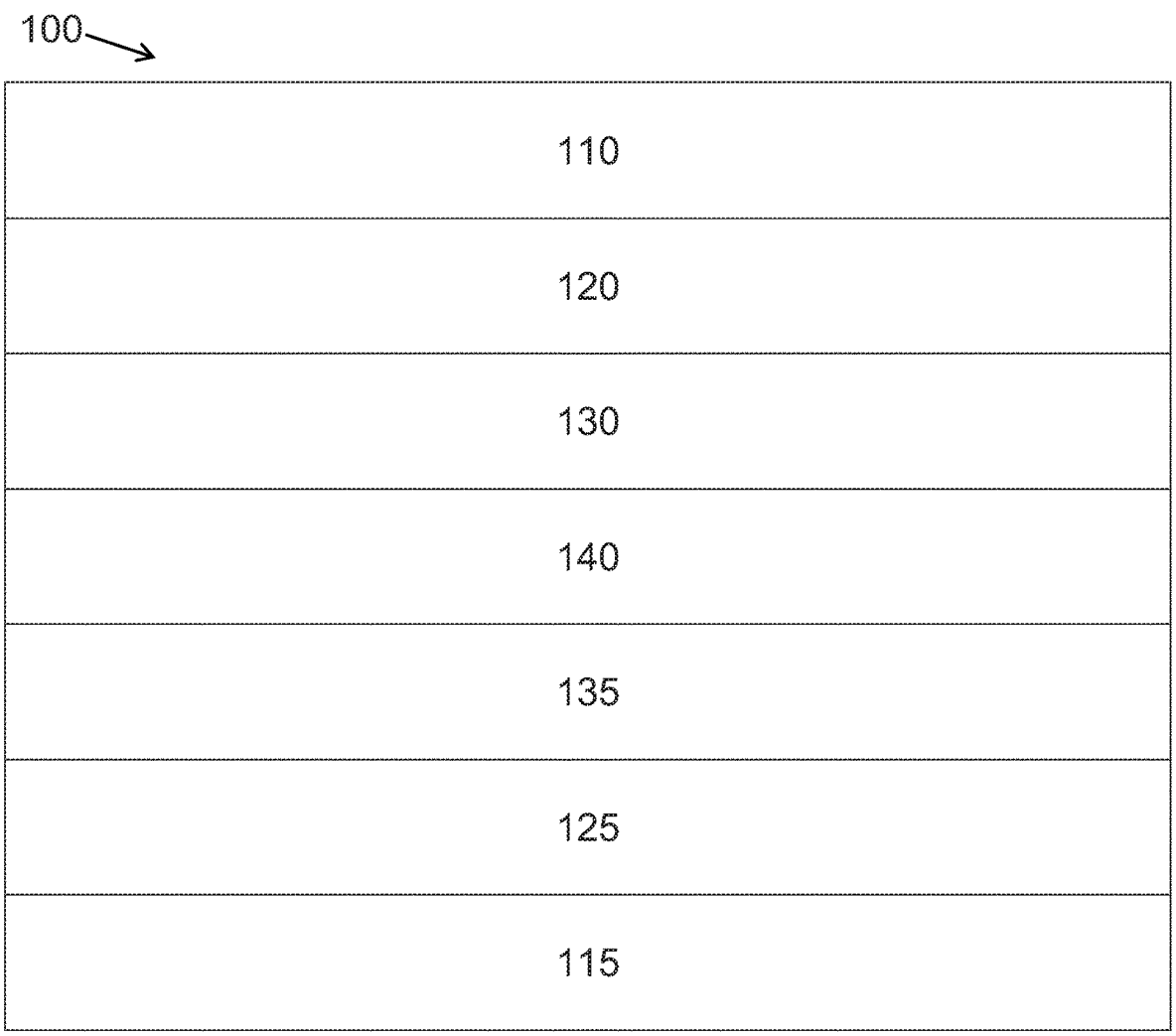
FIG. 1 illustrates a first embodiment of a liquid crystal device in accordance with the present disclosure.

A more complete understanding of the devices and methods disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. In the following specification and the claims which follow, reference will be made to a number of terms, which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing devices or methods as "consisting of" and "consisting essentially of" the enumerated components/steps, which allows the presence of only the named components/steps, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable.

The term "about" can be used to include any numerical value that can vary without changing the basic function of that value. When used with a range, "about" also discloses the range defined by the absolute values of the two endpoints. The term "about" may refer to plus or minus 10% of the indicated number.

The present disclosure relates to a liquid crystal device including an electrically switchable or electrically tunable optical diffraction element embedded in a transparent optical wave guide (e.g., a plane glass plate). In the off-state with no diffractive action, the illumination light is confined within the wave guide structure and is not visible to an outside observer. In the on-state characterized by light diffraction from the embedded element, a portion of the illumination light attains an angle of propagation larger than the critical angle of total internal reflection, thereby making it possible to escape from the wave guide structure and be visible to an outside observer. Using a liquid crystal-based switchable diffraction element, arranged in an array of pixels with a proper passive or active matrix driving capability, the device can display images superimposed on the normal view through the glass plate. Full color display can be achieved by means of the field sequential mode, in which red, green, and blue illumination are switched periodically at a sufficient rate while an appropriate image is synchronously displayed.

Micropatterning, defined herein as micrometer or submicrometer resolution patterning of surface alignment, presents a new route to realize efficient optical switches that do not necessarily require polarizers. The small characteristic length associated with the surface pattern, compared to the ordinary cell gap of liquid crystal displays, leads to a faster response speed. The micropatterned alignment, which can act as a Pancharatnam-Berry prism, can be fabricated via a photoalignment technique. The alignment switching may be driven by the in-plane electric field. Since the optical effects are confined to a single surface, device performance is insensitive to cell thickness, thereby making this mode suitable to flexible device applications. Polarizer-free operation allows unused light to survive in the waveguide structure for later use instead of simply being lost.

The ideal Pancharatnam-Berry phase plate requires a continuous and periodic change of the azimuthal angle (in-plane orientation) of the liquid crystal alignment. Using the maskless photoalignment technique, one period from 0 degrees to 180 degrees of orientation is split into a relatively small number of subdomains with different orientation angles and applied the sequential exposure process with the synchronized polarizer. In some embodiments, subdomains are 6 subdomains with 0, 30, 60, 90, 120, 150 and 180 degrees. The elastic force inside the liquid crystal competing with the surface restriction allows a relaxation of the resultant surface orientation that approximately reproduces the continuous orientation profile. For a finer pitch, an even smaller number of subdomains are utilized (e.g., with 0, 45, 90, 135 and 180 degrees).

In the off-state (e.g., with 0 V applied to the switchable or tunable micropatterned alignment layer and no diffractive action), illumination light is confined within the waveguide structure and is invisible to an outside observer. In the on-state (e.g., when a voltage is applied to the switchable or tunable micropatterned alignment layer and light diffraction occurs), a portion of the illumination light attains an angle of propagation larger than the critical angle of total internal reflection, thereby allowing light to escape from the waveguide and be visible to an outside observer. Using a liquid crystal-based switchable or tunable diffraction element, arranged in an array of pixels with a proper passive or active matrix driving capability, the device can display images superimposed on the normal view through the transparent display (e.g., window). Full color display may be achieves by means of a field sequential mode in which red, green, and blue illumination are switched periodically at a fast enough rate while an appropriate image in synchronously displayed.

FIG. 1 illustrates a first embodiment of a liquid crystal device 100 of the present disclosure. The liquid crystal device 100 includes a first transparent substrate 110, a first transparent electrode 120, a first alignment layer 130, a liquid crystal layer 140, a second alignment layer 135, a second transparent electrode 125, and a second substrate 115.

Figure 2:
FIG. 2 illustrates a second embodiment of a liquid crystal device in accordance with the present disclosure.

FIG. 2 illustrates a first embodiment of a liquid crystal device 200 of the present disclosure. The liquid crystal device 200 includes a first transparent substrate 210, a first transparent electrode 220, a first alignment layer 230, a second alignment layer 235, a liquid crystal layer 240, a second transparent electrode 225, and a second substrate 215.

Figure 3:
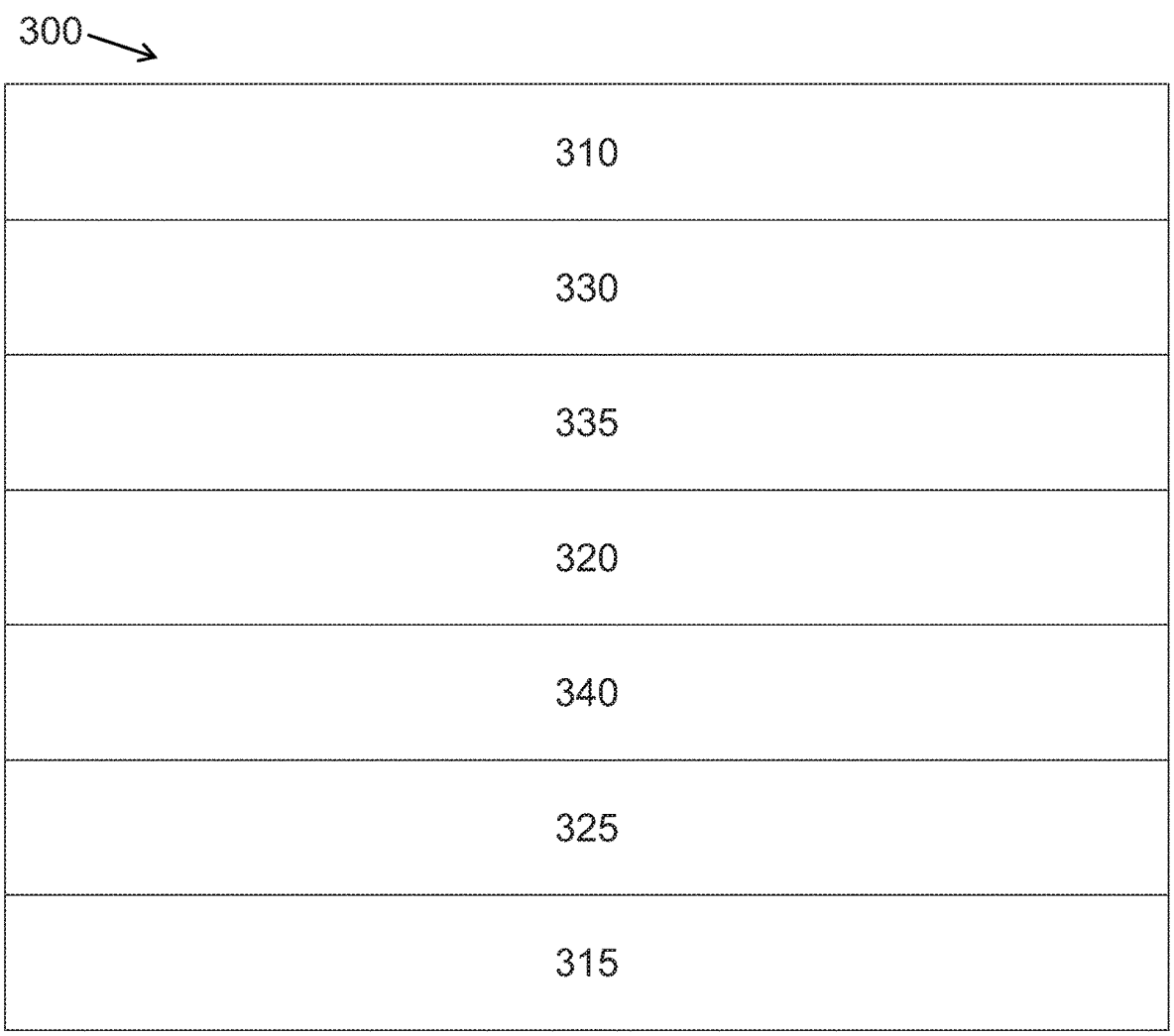
FIG. 3 illustrates a third embodiment of a liquid crystal device in accordance with the present disclosure.

FIG. 3 illustrates a first embodiment of a liquid crystal device 300 of the present disclosure. The liquid crystal device 300 includes a first transparent substrate 310, a first alignment layer 330, a second alignment layer 335, a first transparent electrode 320, a liquid crystal layer 340, a second transparent electrode 325, and a second transparent substrate 315.

Figure 4:
FIG. 4 illustrates a fourth embodiment of a liquid crystal device the present disclosure.

FIG. 4 illustrates a first embodiment of a liquid crystal device 400 of the present disclosure. The liquid crystal device include a first transparent substrate 410, a first alignment layer 430, a first transparent electrode 420, a liquid crystal layer 440, a second transparent electrode 425, a second alignment layer 435, and a second transparent substrate 415.

The transparent substrates 110, 115, 210, 215, 310, 315, 410, 415 may be comprised of glass or transparent plastic. In some embodiments, the transparent plastic comprises a polycarbonate, a polyethylene, a polyester (e.g., polyethylene terephthalate), and/or a polyacrylate. In some embodiments, the transparent substrates have thicknesses of from about 100 μm to about 500 μm. The thicknesses of the substrates may be the same or different. The materials of the substrates may be the same or different.

The transparent electrodes 120, 125, 220, 225, 320, 325, 420, 425 may be comprised of indium-tin oxide or a layer of a conductive polymer. In some embodiments, the conductive polymer comprises poly(3,4-ethylenedioxythiophene) (PEDOT), polystyrene sulfonate (PSS), or a mixture thereof. In some embodiments, the transparent electrodes have thicknesses of less than about 0.1 μm. The thicknesses of the electrodes may be the same or different. The materials of the electrodes may be the same or different.

The liquid crystal layer 140, 240, 340, 440 may be comprised of any nematic liquid crystals. In some embodiments, the liquid crystal layer contains 4-cyano-4'-pentylbiphenyl (5 CB). The liquid crystal layer may have a thickness of from about 1 μm to about 10 μm, including from about 3 μm to about 7 μm and about 5 μm. The liquid crystals may have a birefringence of at least 0.1. In some embodiments, the liquid crystals exhibit a birefringence of at least 0.2 or at least 0.3.

The alignment layers 130, 135, 230, 235, 330, 335, 430, 435 may have thicknesses of up to about 0.5 μm, including from about 0.01 μm to about 0.1 μm. The alignment layers may be formed via any suitable alignment technique. In some embodiments, the surface alignment technique is photoalignment, nanorubbing (e.g., atomic force microscope nanorubbing), nanoimprinting, or photolithography. The alignment layers may have the same or different thicknesses. The alignment layers may be formed from the same or different methods. The alignment layers may be comprised of the same or different materials. Examples of nanoimprinting are described in "A functionally separated nanoimprinting material tailored for homeotropic liquid crystal alignment", Nanotechnology 19 (2008) 395301, pp. 1-6, the contents of which are incorporated by reference herein. Examples of nanorubbing are described in "Tristable nematic liquid-crystal device using micropatterned surface alignment", Nature, Vol. 420, 14 Nov. 2002, pp. 159-162, the contents of which are incorporated by reference herein. Examples of photoalignment are described in "Photoalignment of Liquid-Crystal Systems", Chem. Rev. 2000, 100, 1847-1873, the contents of which are incorporated by reference herein.

The alignment layers are deposited on or embedded in at least one of the transparent substrate and the transparent electrode.

Figure 5:
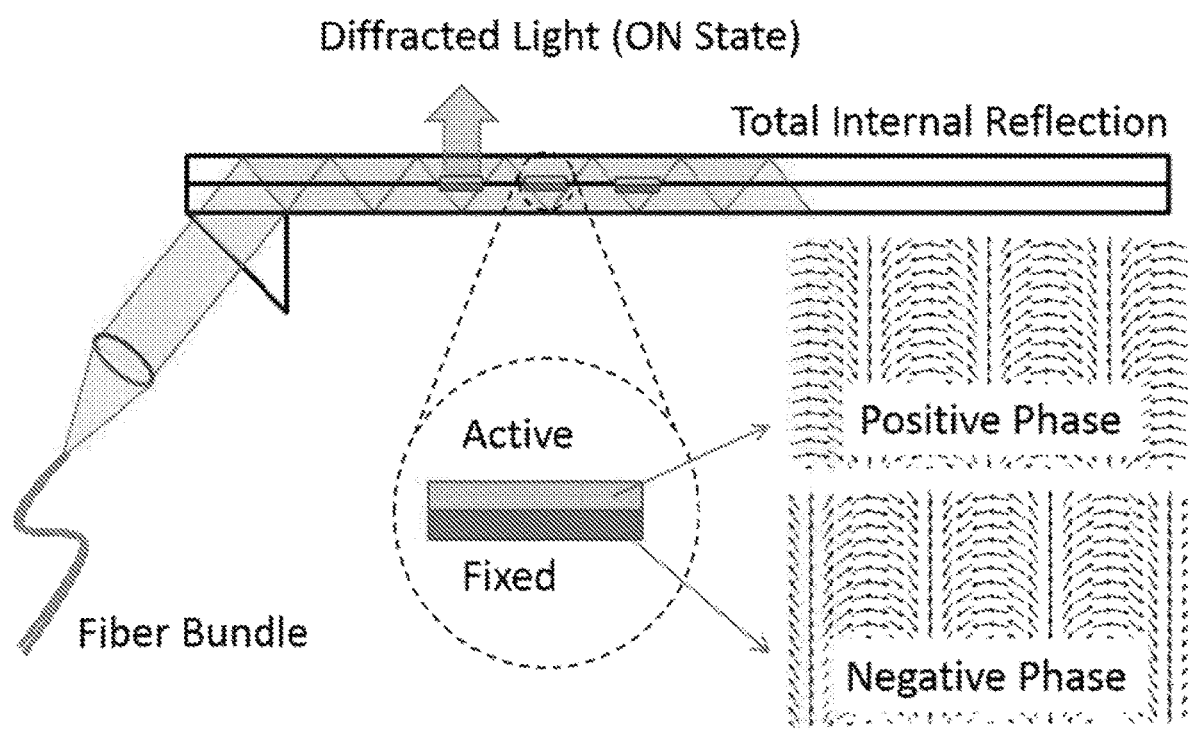
FIG. 5 illustrates a dual-layer diffractive element in accordance with some embodiments of the present disclosure.

Generally, one of the alignment layers is active (i.e., switchable or tunable) and the other alignment layer is fixed. For example, one of the alignment layers may be switchable or tunable based on an applied voltage while the other alignment layer is fixed (e.g., not responsive to the applied voltage). The diffractions of the alignment layers are configured to cancel each other in the off-state. In the on-state, the diffraction from the active layer is diminished, thereby allowing part of the diffracted light from the fixed film to break the total internal reflection condition and escape from the wave guide as illustrated in FIG. 5. In FIG. 5, the stack of negative and positive phase plates yields achromatic dark state in the off-state. The applied voltage continuously reduces the phase compensated components, resulting in a progressively bright state until the phase shift disappears.

In some embodiments, the active alignment layer is a photoalignment layer containing a photoalignment material. The photoalignment material may be an azo-based photoalignment material. The azo-based material may be a polymer or a small molecule. In some embodiments, the azo-based material is 2-(N,N-Dimethyl-4-aminophenyl) azobenzenecarboxylic acid (methyl red) or a sodium salt of 4,4'-bis(4-hydroxy-3-carboxy-phenylazo)benzidine-2,2'-disulphonic acid (SD1). In the case of SD1, photoalignment is due to photo-isomerization. A linearly polarized light induces a selective transition of SD1 molecules in the trans form aligned along the polarization axis to the cis form. The cis isomers undergo a relaxation to the trans form with orientation spread from the original orientation. Over time, the trans isomers along the polarization axis are pumped out and depleted. The orientational redistribution of trans isomers causes photoalignment perpendicular to the polarization axis.

Reactive mesogens may be included in the alignment layer(s).

The photoalignment material may be deposited on the substrate or electrode in a composition that further includes a solvent and optionally other additives. The solvent may be polar, apolar, or non-polar. In some embodiments, the solvent is demthylformamide or water. The photoalignment material may be present in the solution in an amount of from about 1 to about 2 wt %.

Photoalignment may be carried out at temperatures above the glass transition temperature of the photoalignment material.

The dual layer alignment system provides advantages such as eliminating the need to fabricate vertical light blocks, eliminating the need of a microlens array to collimate back light in each pixel, superior dark state (better compensation of chromatic aberration), reduced requirements for diffraction angle and efficiency, less distorted transparency, and the possibility of employing a wider variety of diffractive elements such as diffraction grating and liquid-crystal polarization grating.

Figure 6:
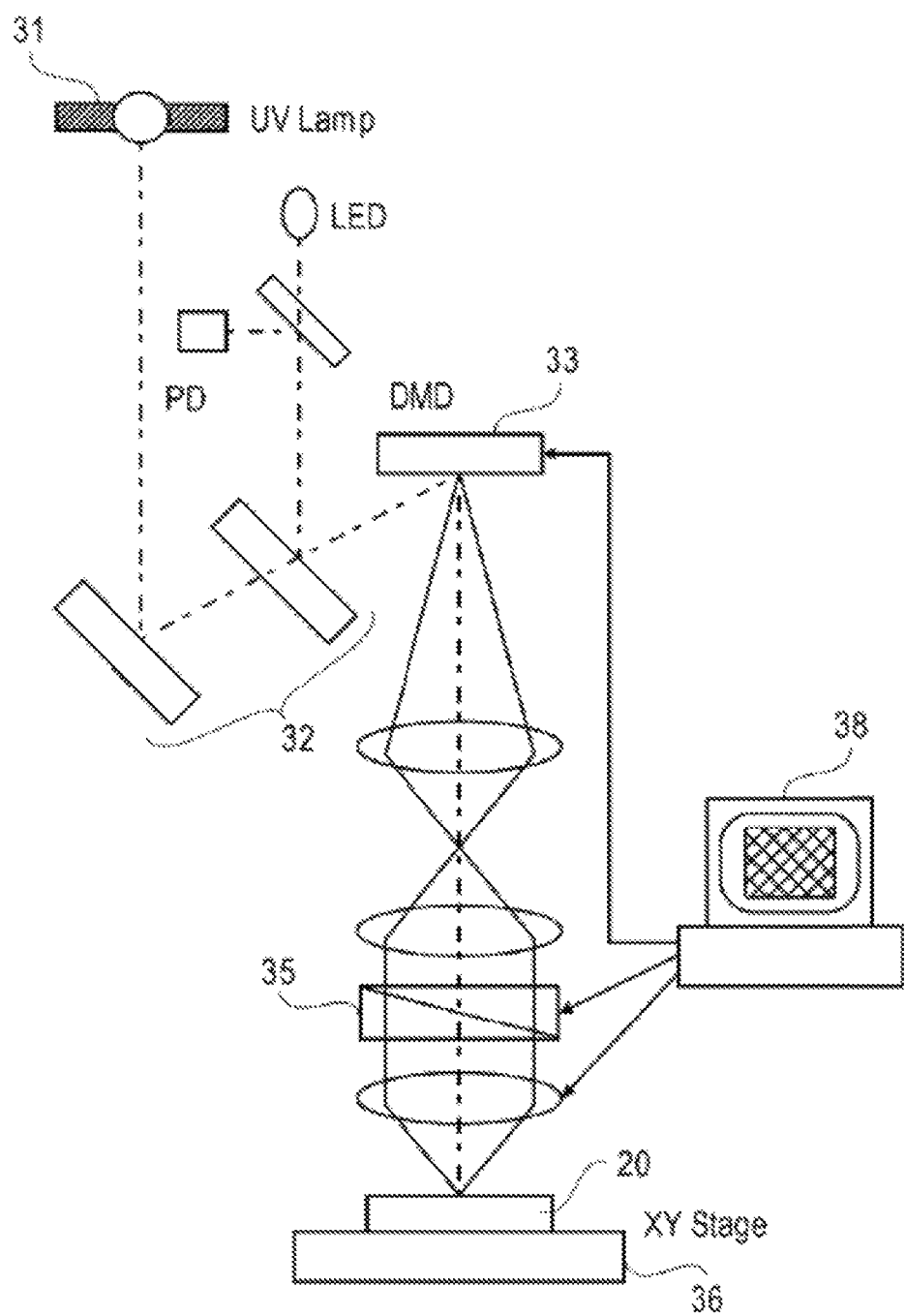
FIG. 6 illustrates and exemplary maskless photoalignment system in accordance with some embodiments of the present disclosure.

FIG. 6 illustrates an exemplary maskless photoalignment system. In the setup that is shown, light 10 from a UV lamp 31 is directed toward a digital micro-mirror device (DMD) 33 via a set of reflective elements 32. The DMD 33, controlled by a computer 38, creates the light 10 of a desired pattern by using a motor-driven polarizer 35. The patterned light is then directed to the substrate 20 resting on an X-Y stage 36. The rotation of the polarizer 35 is synchronized with the pattern in the light 10. The computer 38 also controls the resolution of the pattern in the light 10. The DMD 33, the motor-driven polarizer 35, and the peripheral optical elements pattern the linearly polarized light 10 down to the micrometer or sub-micrometer dimension. The pattern may be changed by using the computer 38. An exemplary system is more particularly described in U.S. Patent Application Publication No. 2014/0212798, the contents of which are incorporated by reference herein.

The fixed alignment layer may function as a compensation layer. In this configuration, the fixed alignment layer may effectively offset the active alignment layer such that no light from a light source is visible to an outside observer when the active alignment layer is in an off-state.

For the fixed diffraction grating, a few micron-thick layer of reactive mesogen may be first applied to the micropatterned alignment surface prepared by the maskless technique. After the evaporation of the solvent, the reactive mesogen leaves a cross-linkable nematic liquid crystal. By irradiating with a UV light, the reactive mesogen is cross-linked and is permanently fixed. The retardation value of this fixed layer is proportional to the thickness and must be adjusted to the off state retardation of the active nematic liquid crystal layer to be applied. The retardation value can be fine adjusted by applying a magnetic or electric field. After UV cross-linking, another layer of the photoalignment material may be formed directly on top of the cross-linked reactive mesogen. The maskless photoalignment can then be carried out in such a way that the on the subdomain with the angle x in the reactive mesogen is irradiated with a light polarized along x direction so as to align the liquid crystal at x+90 degrees, thereby making the alignment in the reactive mesogen and the active liquid crystal layers complementary to each other.

In some embodiments, the display device has a response time of less than about one millisecond.

The contrast ratio of the display device may be greater than about 2000:1.

In some embodiments, the viewing angle of the display device is at least about 170°.

The displays of the present disclosure may be used to make glass windows "smart" in the sense that digital information can be displayed on the windows without obstructing the view. Non-limiting examples of windows include building windows, showcase windows, automobile windshields (e.g., to provide a head-up display), and lids (e.g., glass lids) of storage boxes.

The following examples are provided to illustrate the devices and methods of the present disclosure. The examples are merely illustrative and are not intended to limit the disclosure to the materials, conditions, or process parameters set forth therein.

EXAMPLES

Example 1: Micro-Patterned Photoalignment Structures

Figure 7A:
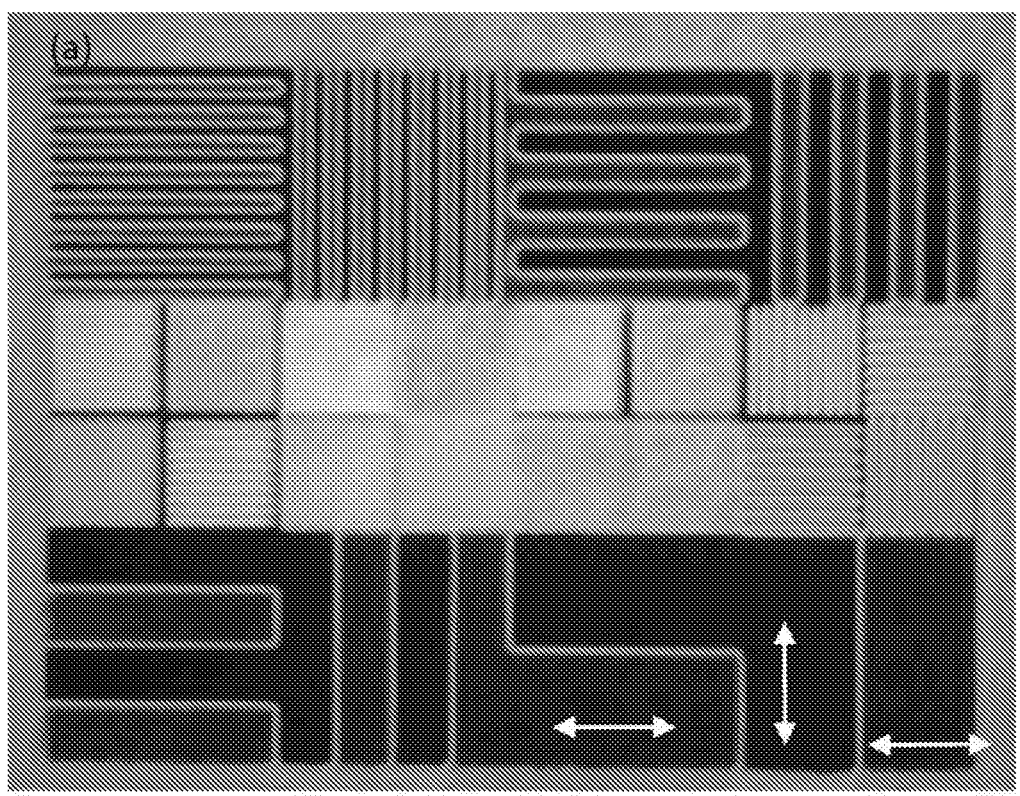
FIG. 7 illustrates exemplary micro-patterned photoalignment structures in accordance with some embodiments of the present disclosure.
Figure 7B:
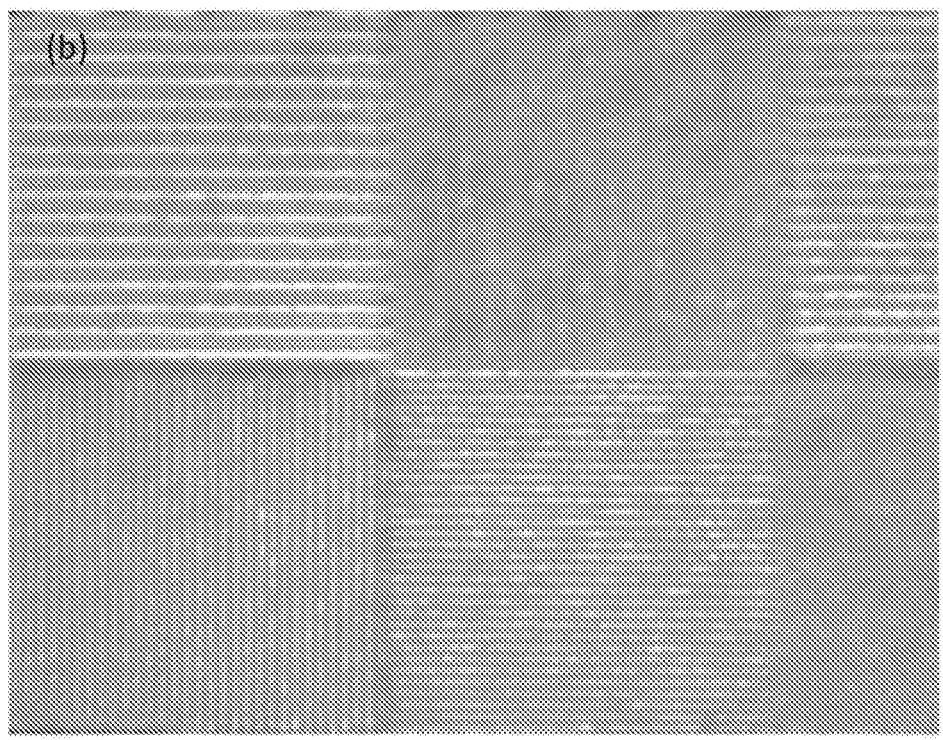

Micro-patterned photoalignment structures were produced with a variety of periodicities. The test patterns included two mutually orthogonal domains. An azobenzene-based polymeric material was used for the photoalignment layer. The results are illustrated in FIG. 7. In FIG. 7A, the fact that the neighboring domains have the same dark brightness indicates that photoalignment was achieved in the expected manner. The bright lines are due to intermediate orientation and the phase cancellation between the light beam passing through neighboring regions. FIG. 7B illustrates finer strip patterns. The bottom two square domains are 4 μm pitch stripe.

Cross-linking type photoalignment materials showed, after UV exposure to fix the alignment, granular textures that deteriorate the dark state between crossed polarizers. The granules are likely to be related to cross-linked crystalline polymer grains with slightly different orientations. Small molecular azobenzene derivatives exhibited somewhat improved uniformity.

The irradiation of the optical pattern was conducted at an elevated temperature over 100° C. in order to eliminate the film preparation history. The white arrows indicate the directions of alignment as expected from the orientation polarizer. The identical contract between the two alleged orthogonally aligned domains is an indication of the success of the photoalignment.

Example 2: Guided Wave Lighting

A fiber-coupled guided wave back panel was assembled. Using a bundle of optical fibers ranging in size from 100 μm-diameter to 500 μm-diameter, a linear array of light source was fabricated and directly coupled to a liquid crystal cell containing the photoaligned diffraction pattern. Given the 1 mm-thickness of the glass substrate, the majority of light beams went straight from the entrance to the exit without reflection. A weak scattering of light from the nematic liquid crystal layer was observed, but no diffraction from the micro pattern emerged due to the insufficient diffraction angle. This set up demonstrated the ease of fabricating a working wave guide back lighting.

Example 3: Coating and Photoalignment

Solutions containing SD1 were spin-coated onto ITO glass substrates. Tighter packing of SD1 in the layer led to reduced photoalignment efficiency. Spin-coating involves a drying process of the solvent after the solution is spun over the surface, through which a condense layer of solute is left on the substrate. The drying and condensation process may vary depending on the types of solvent and the temperature. When the vapor pressure of the solvent is high, drying proceeds quickly. If the molecular affinity between the solute and the solvent is low or if the solubility is low, less solvent remains in the condense state of solute after drying, thereby making it more likely for SD1 to assume the equilibrium structure (i.e., crystal).

Two different solvents were tested: N'N-dimethylformamide (DMF) and water. DMF has a lower vapor pressure with the boiling point at 154° C. than water and showed an increased dissolving capability. The spin-coated films of SD1 at 1500 rpm had different structures depending on the solvent. For the water solution, SD1 condensed into microcrystallites on the ITO glass surface. The microcrystallites had sizes ranging from a few to a few tens of μm. Once SD1 is packed in this crystalline form, it is not ideal for photoalignment.

In contrast, the DMF solution provided an optically clear and amorphous film on the ITO, implying the probable retainment of DMF molecules in the film. Drying speed can be enhanced by elevating the temperature on a hot plate up to 150° C., but the control of DMF retainment becomes more difficult. It was observed that the amorphous film transforms itself gradually to a crystalline film as obtained with a water solution over the time period of one month.

SD1's absorption peak is at slightly below 400 nm. In the UV region below 400 nm, the cis-to-trans isomerization is so slow that the cis form persists indefinitely, once transformed from the trans isomer. Under these circumstances, the photoalignment associated with the selected reorientation of the trans isomer is not efficient because the cyclic transformation between the trans and cis forms is a rare event. Consequently, a longer wavelength light (e.g., 460 nm) was utilized.

The system of FIG. 6 was used for maskless photoalignment. The LED DMD had a 1280×800 resolution and the physical dimensions of the DMD were about 10 mm×6.5 mm, which is half the linear dimension compared to a previously used DMD. The size of the single micromirror was 8 μm×8 μm, so that a 10:1 projection optics generated a sub-micron pixel on the photoalignment layer.

The system was equipped with a precision motorized x,y-stage that can reproducibly control the position of the substrate over 100 mm with a repeatability of 1 μm. Focusing was performed manually by viewing the physical surface and the projected pattern through an eyepiece. Empirically, this method of focusing works well, but for finer focusing, a CCD camera capturing a magnified image of the substrate can be used.

The LED light reflected by the DMD forms a real image before the polarizer and the objective lens. At this position, the light pattern can be further manipulated by inserting a variety of mask and light modulators.

Photoalignment layers prepared by spin-coating the SD1/DMF solution exhibited an optically clear and uniform state. The intensity of the 465 nm band from the DMD is about 120 μW after the linear polarizer, which gives, for the 10× objective lens, the power density of 15 mW/cm$^2$ on the photoalignment layer. A well-saturated photoalignment was observed to occur for 15 seconds exposure. Therefore, the energy dose was about 230 mJ/cm$^2$. The required dose increases as the layer becomes more "dry" after a prolonged annealing at elevated temperatures.

For patterning purposes, good results were achieved when the layer was initialized by a uniform irradiation of a linearly polarized light. Subsequent irradiations by patterned light should be controlled to an optimal exposure time.

Figure 8A:
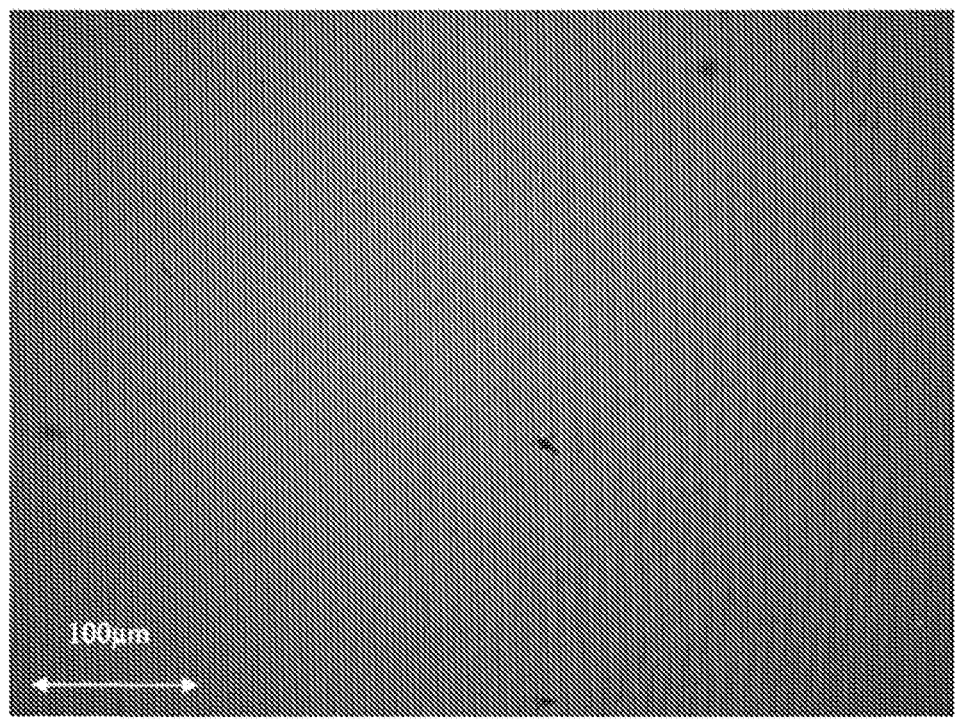
FIG. 8 illustrates an exemplary grating structure in accordance with some embodiments of the present disclosure.
Figure 8B:
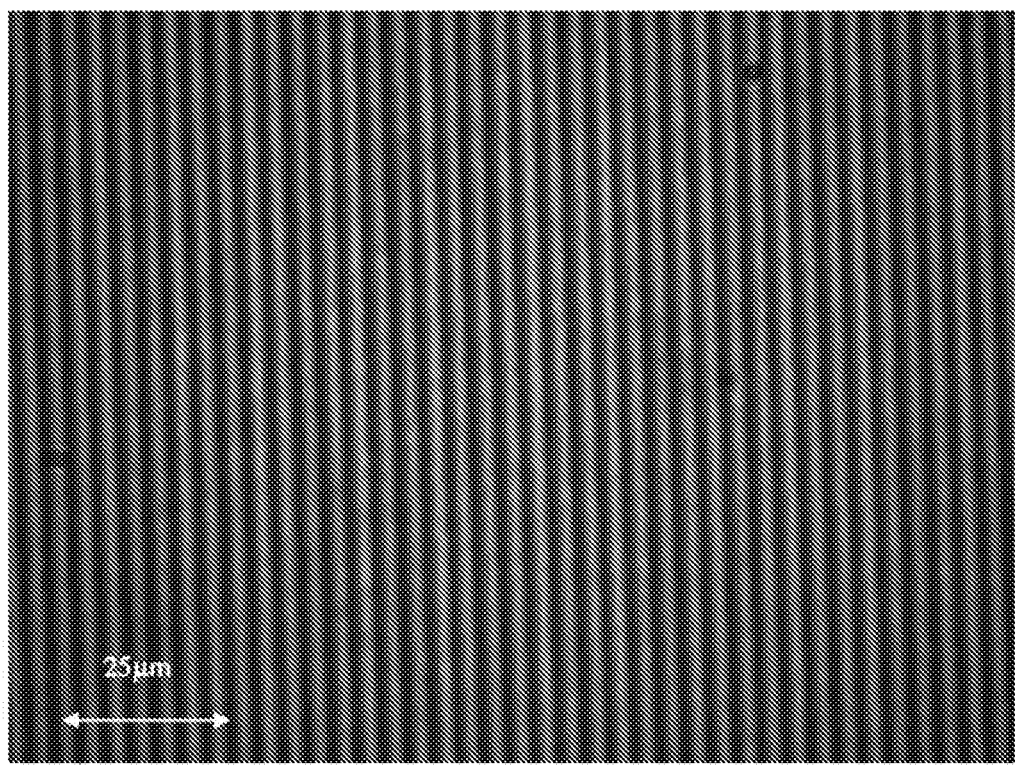

FIGS. 8A and 8B show a grating including two orthogonal directions under a polarizing microscope. The liquid crystal was 5 CB and the counter surface was homeotropically aligned. The grating was prepared using a 10× objective lens with a 2 px-line and 2 px-space pattern, which makes an approximately 4 μm pitch grating. 1 px-line and 1 px-space pattern was optically possible, but the DMD exhibited an interference modulation (probably due to the interlacing of the DMD driver). To achieve finer gratings, higher power objectives could be used. A 10× objective lens was utilized for FIG. 8A. A 40× objective lens was utilized for FIG. 8B.

Example 4: Prototype Fabrication

Figure 9:
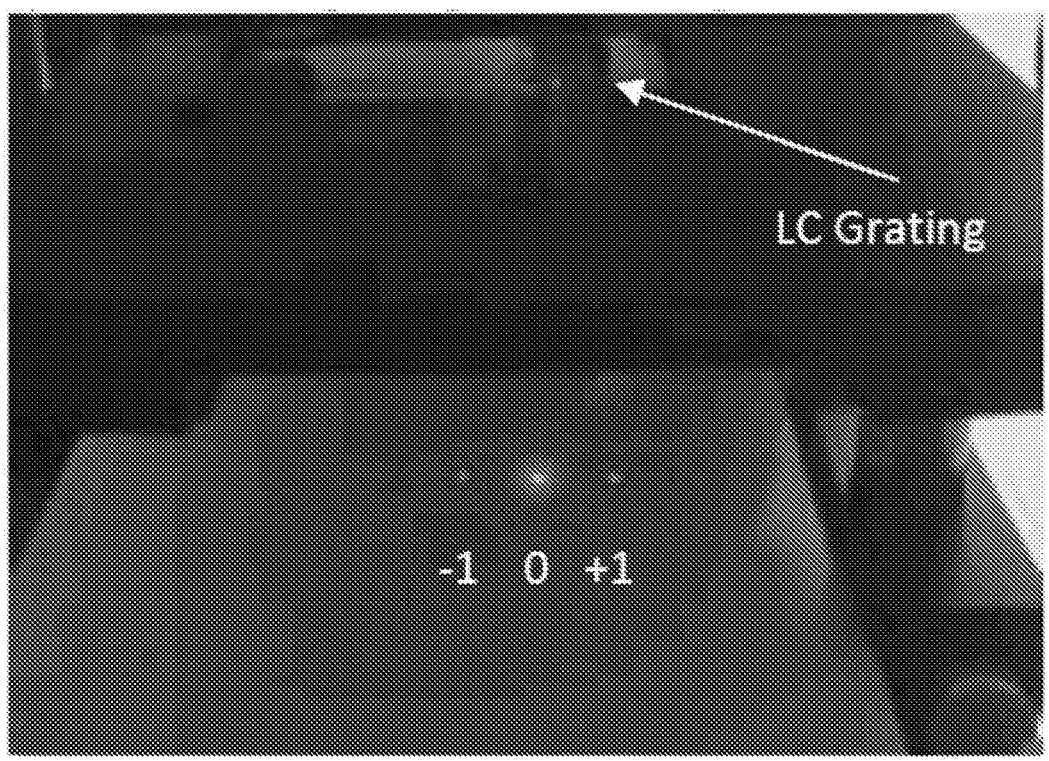
FIG. 9 illustrates diffraction spots from the grating of FIG. 8.

For prototype device fabrication, 20× and 40× objectives were used. FIG. 9 shows diffraction spots from the grating shown in FIG. 8.

A simplified device was prepared. This device differed from exemplary devices of the present disclosure in that the diffractive element was a bidirectional grating, not a continuously winding Pancharatnam phase plate. And no compensation double layer structure was implemented. Thus, at zero applied voltage, there appeared a diffracted light and at higher voltage, the light continuously disappeared.

To obtain a higher angle of diffraction, the pitch of the grating was reduced by a factor of two by employing a 40× objective lens for a 4 px-4 px line and space pattern. The width of the single line was 1 μm, generating a diffraction angle of approximately 30 degrees in air. Under the 40× objective lens, the single shot process area is ¼ of the 10× objective case; therefore, to obtain 1 mm×0.65 mm area, 16 shots must be tiled. The single shot exposure time is reduced to about 2 to 3 seconds, thereby making 16 time exposure require less than one minute of net process time.

Figure 10:
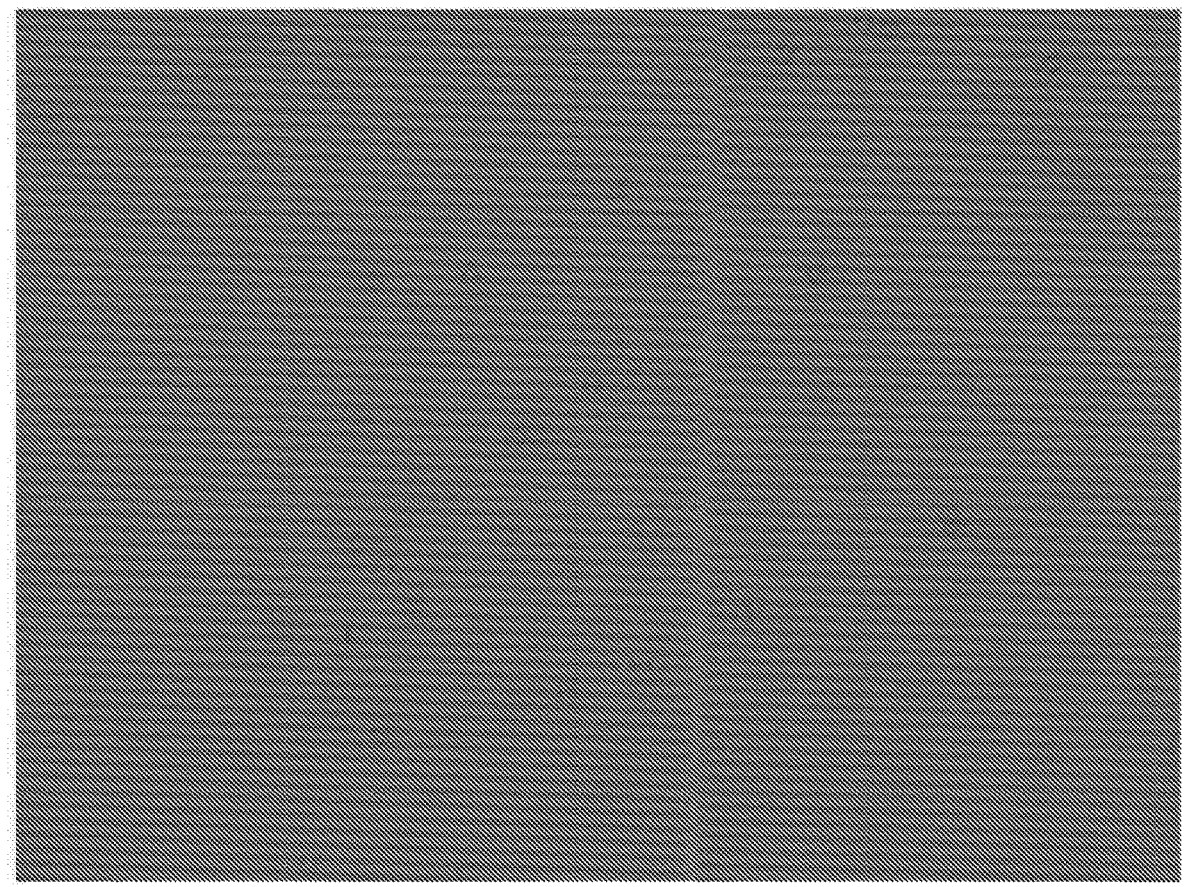
FIG. 10 illustrates a 1 µm-1 µm bidirectional liquid crystal grating in accordance with some embodiments of the present disclosure.

FIG. 10 illustrates the 1 μm-1 μm bidirectional liquid crystal grating. Two patterns were stiched along the vertical line near the center. The micrograph was obtained using a 40× objective.

Figure 11:
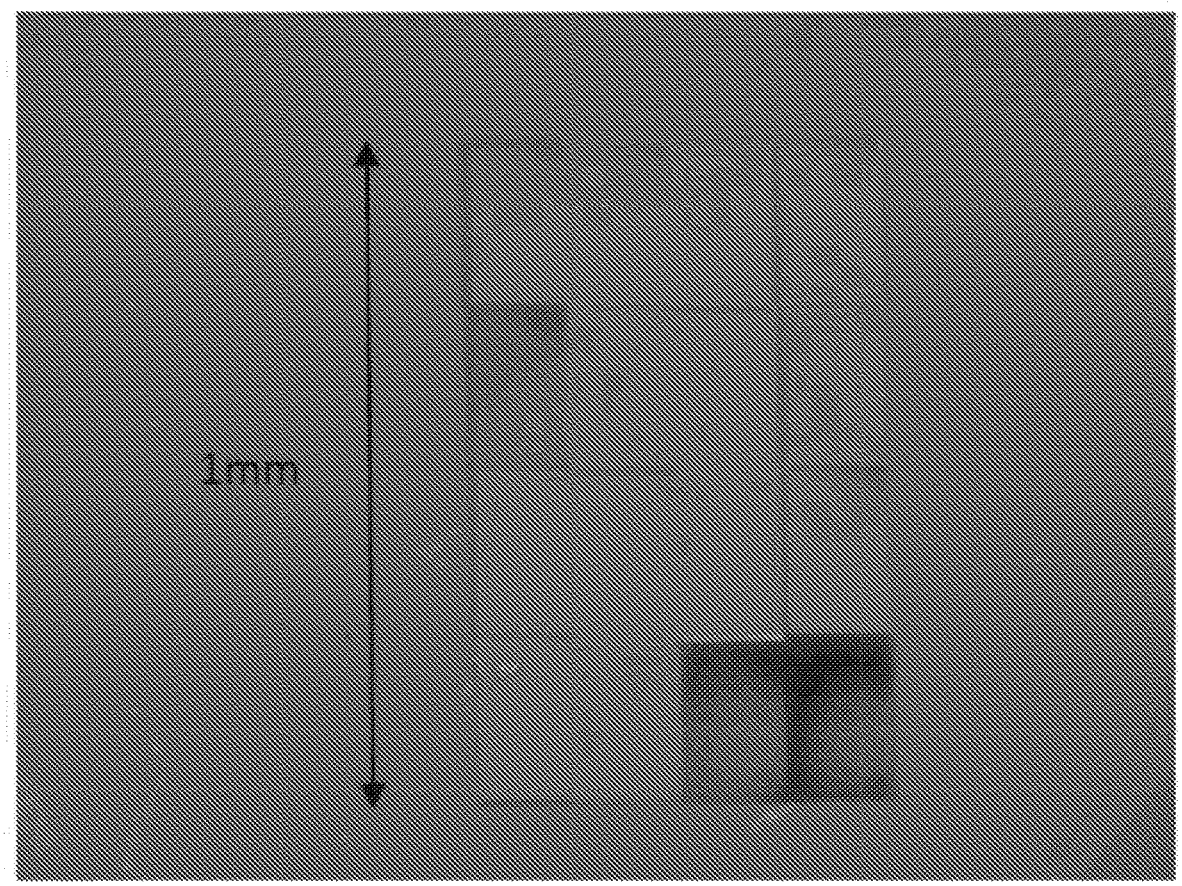
FIG. 11 illustrates 16 stitched grating patterns of a prototype device in accordance with some embodiments of the present disclosure.

FIG. 11 illustrates the 16 stiched grating patterns for the prototype device.

Figure 12:
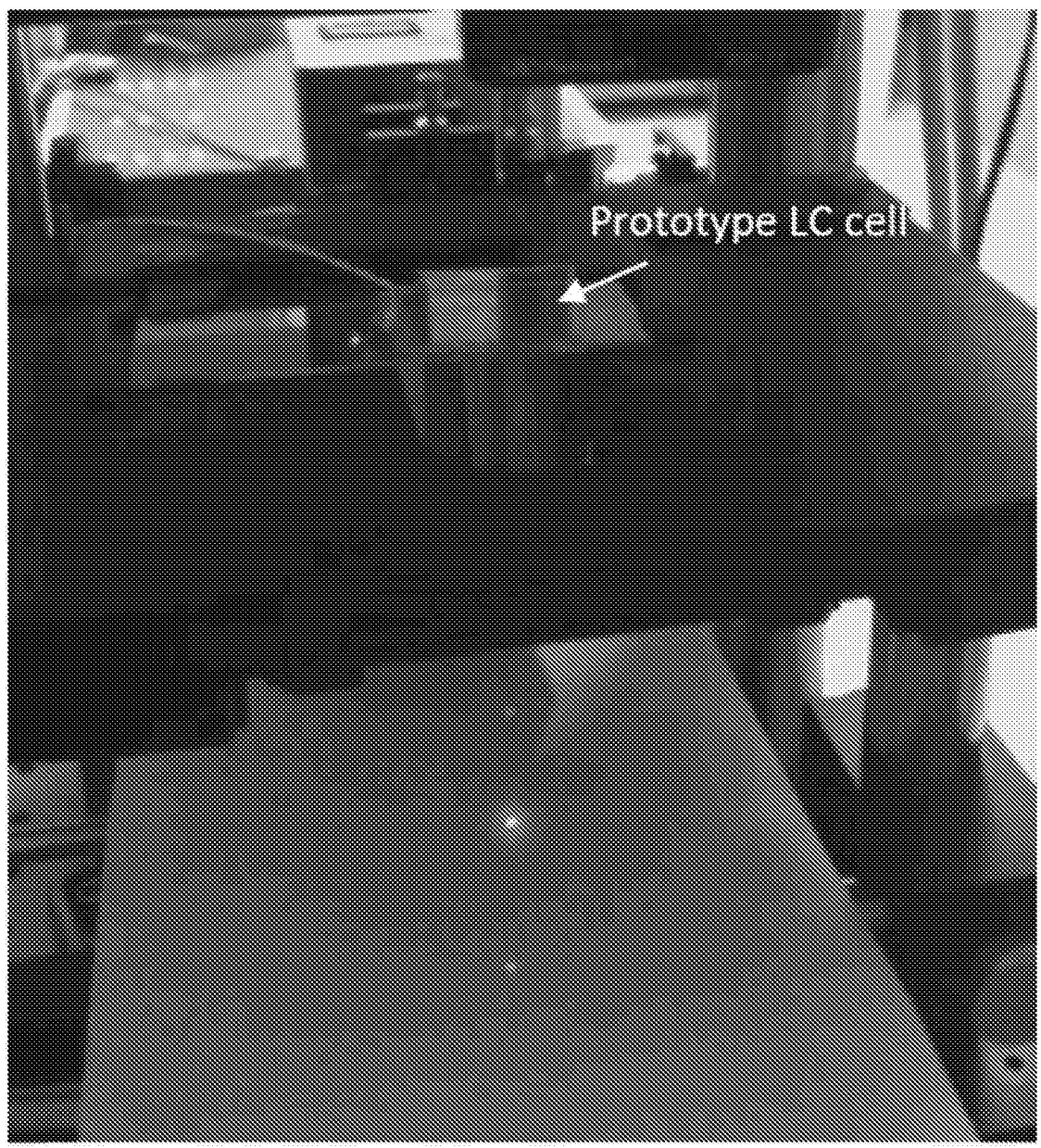
FIG. 12 illustrates the diffraction from the prototype device in air.

FIG. 12 illustrates the diffraction from the prototype device in air. As shown in FIG. 12, the diffraction angle is sufficiently large to be able to demonstrate the broken total internal reflection operation. A prism coupler was attached at the end of the liquid crystal cell including the patterned substrate and a uniform homeotropically aligned counter ITO substrate.

Figure 13A:
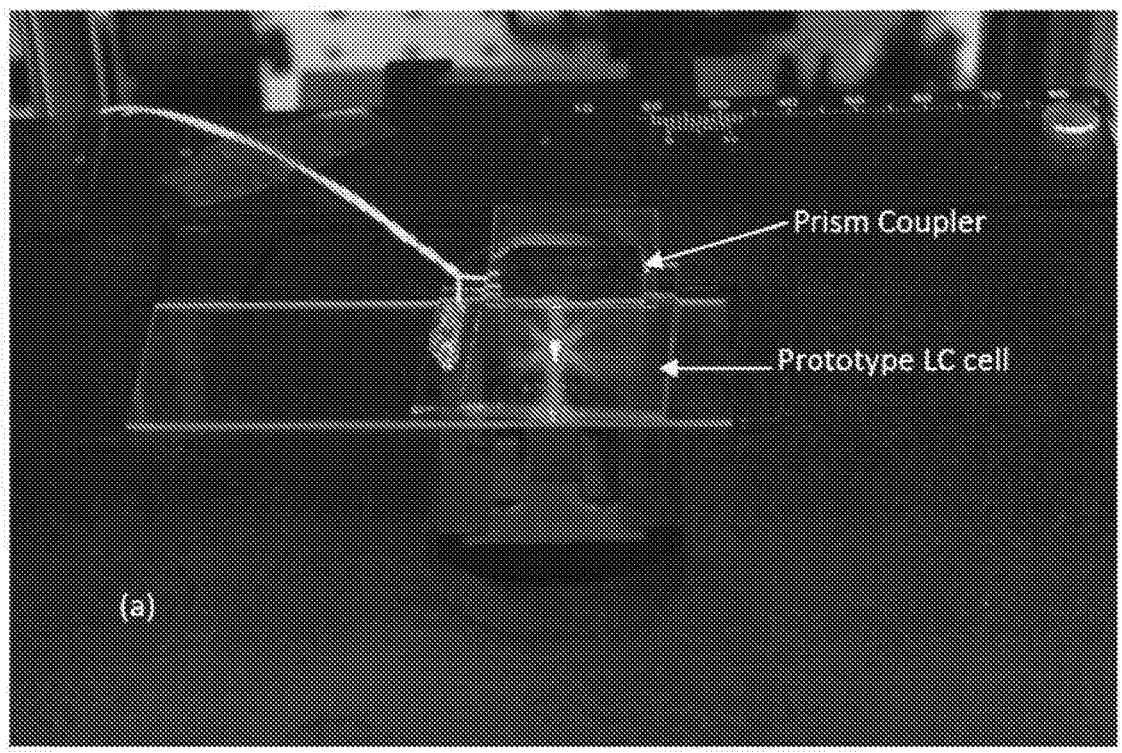
FIG. 13 illustrates diffraction switching of the prototype device.
Figure 13B:
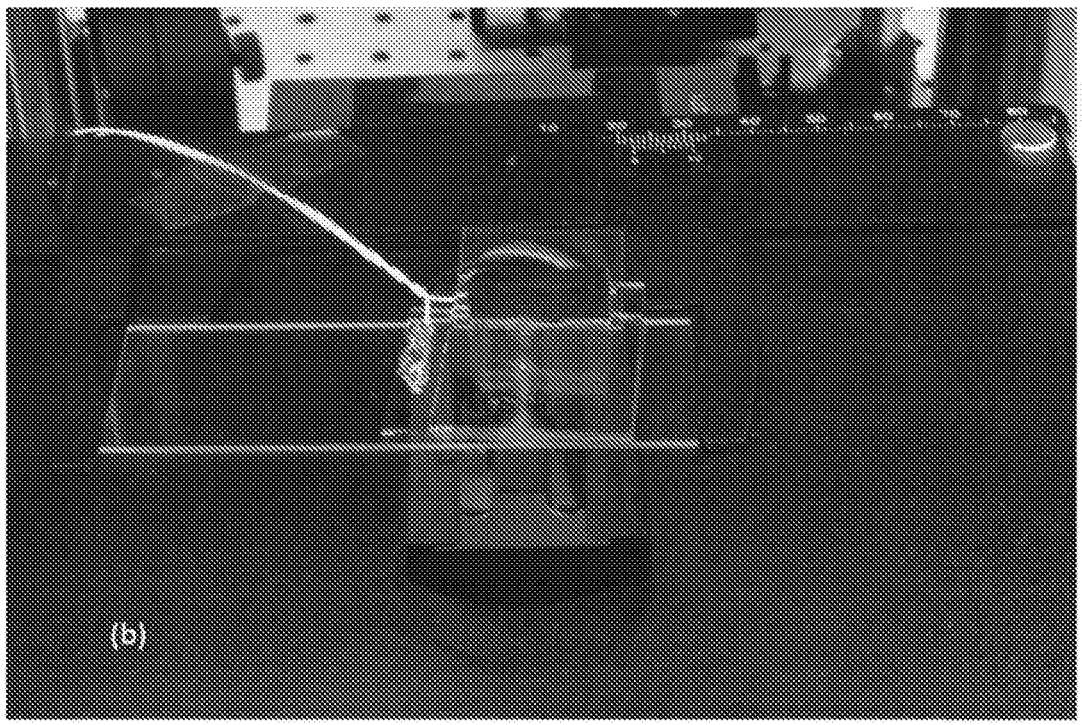

FIGS. 13A and 13B illustrates diffraction switching of the prototype device. In FIG. 13A, a high diffraction state at V=0V is shown. The bright spot at the center is the patterned alignment area. In FIG. 13B, the low diffraction state at V=23V is shown.

The prototype was proven to work in the polarizer-free transparent display mode. The weak band of light running across the cell is due to a scattering of totally internally reflected light at the surface defects/contaminants. Due to the lack of compensation, the zero diffraction condition could not be achieved even at a voltage higher than 20V for a 5 μm gap cell. The driving voltage can be reduced when a compensation layer is added.

The present disclosure has been described with reference to exemplary embodiments. Obviously, modifications and alternations will occur to others upon reading and understanding the preceding detailed description. It is intended that the present disclosure be construed as including all such modifications and alterations insofar as they come within the scope of the appended claims or the equivalents thereof.

The invention claimed is:

1. A liquid crystal device comprising:
   a light source;
   a first transparent substrate;
   a first transparent electrode;
   a switchable or tunable micropatterned alignment layer arranged in an array of pixels;

a liquid crystal layer;
a fixed alignment layer;
a second transparent electrode; and
a second transparent substrate;
wherein the device is polarizer-free;
wherein the switchable or tunable micropatterned alignment layer is disposed between the liquid crystal layer and one of the first transparent substrate and the second transparent substrate;
wherein the fixed alignment layer is disposed between the liquid crystal layer and one of the first transparent substrate and the second transparent substrate;
wherein light from the light source is not visible outside the liquid crystal device when the switchable or tunable micropatterned alignment layer is in an off-state; and
wherein the switchable or tunable micropatterned alignment layer and the fixed alignment layer are in direct physical contact with the liquid crystal layer.

2. The liquid crystal device of claim 1, wherein the switchable or tunable micropatterned alignment layer is disposed on or embedded in an interior surface of the first transparent substrate.

3. The liquid crystal device of claim 1, wherein the switchable or tunable micropatterned alignment layer is disposed on or embedded in a surface of the first transparent electrode.

4. The liquid crystal device of claim 1, wherein the first transparent electrode and the second transparent electrode comprise indium-tin oxide.

5. The liquid crystal device of claim 1, wherein switching or tuning of the switchable or tunable micropatterned alignment layer is driven by an in-plane electric field.

6. The liquid crystal device of claim 1, wherein the liquid crystal layer comprises nematic liquid crystals.

7. The liquid crystal device of claim 1, wherein the switchable or tunable micropatterned alignment layer is aligned via photoalignment, atomic force microscope nanorubbing, nanoimprinting, or photolithography.

8. The liquid crystal device of claim 1, wherein the switchable or tunable micropatterned alignment layer comprises an azobenzene-based compound.

9. The liquid crystal device of claim 1, wherein the liquid crystal layer comprises liquid crystals having a birefringence of at least 0.1.

10. The liquid crystal device of claim 1, wherein the liquid crystal layer comprises liquid crystals having a birefringence of at least 0.2.

11. The liquid crystal device of claim 1, wherein the liquid crystal layer comprises liquid crystals having a birefringence of at least 0.3.

12. The liquid crystal device of claim 1, wherein the liquid crystal layer is disposed between the switchable or tunable micropatterned alignment layer and the fixed alignment layer.

13. A liquid crystal device comprising:
a light source;
a first transparent substrate;
a first transparent electrode;
a switchable or tunable micropatterned alignment layer arranged in an array of pixels;
a liquid crystal layer;
a fixed alignment layer;
a second transparent electrode; and
a second transparent substrate;
wherein the device is polarizer-free;
wherein the switchable or tunable micropatterned alignment layer is disposed between the liquid crystal layer and the first transparent substrate;
wherein the fixed alignment layer is disposed between the liquid crystal layer and the second transparent substrate;
wherein light from the light source is not visible outside the liquid crystal device when the switchable or tunable micropatterned alignment layer is in an off-state; and
wherein the switchable or tunable micropatterned alignment layer and the fixed alignment layer are in direct physical contact with the liquid crystal layer.

14. The liquid crystal device of claim 13, wherein the first transparent electrode and the second transparent electrode comprise indium-tin oxide.

15. The liquid crystal device of claim 13, wherein switching or tuning of the switchable or tunable micropatterned alignment layer is driven by an in-plane electric field.

16. The liquid crystal device of claim 13, wherein the liquid crystal layer comprises nematic liquid crystals.

17. The liquid crystal device of claim 13, wherein the liquid crystal layer comprises liquid crystals having a birefringence of at least 0.1.

18. A liquid crystal device comprising a light source and further comprising in sequence:
first transparent substrate;
a first transparent electrode;
a switchable or tunable micropatterned alignment layer arranged in an array of pixels;
a liquid crystal layer;
a fixed alignment layer; and
a second transparent electrode; and
a second transparent substrate;
wherein the device is polarizer-free;
wherein light from the light source is not visible outside the liquid crystal device when the switchable or tunable micropatterned alignment layer is in an off-state; and
wherein the switchable or tunable micropatterned alignment layer and the fixed alignment layer are in direct physical contact with the liquid crystal layer.

* * * * *